*US009897213B2*

United States Patent
Roddis et al.

(10) Patent No.: US 9,897,213 B2
(45) Date of Patent: Feb. 20, 2018

(54) FLOW INDUCING RING FOR A MECHANICAL SEAL

(75) Inventors: Alan James Roddis, Sheffield (GB); Easa Taheri-Oskouei, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 12/900,267

(22) Filed: Oct. 7, 2010

(65) Prior Publication Data

US 2011/0227290 A1   Sep. 22, 2011

Related U.S. Application Data

(63) Continuation-in-part of application No. 11/910,261, filed as application No. PCT/GB2006/001210 on Mar. 31, 2006, now abandoned.

(30) Foreign Application Priority Data

Mar. 31, 2005 (GB) .................................. 0905131.9

(51) Int. Cl.
F16J 15/34 (2006.01)

(52) U.S. Cl.
CPC ................................ *F16J 15/3404* (2013.01)

(58) Field of Classification Search
CPC ........................... F16J 15/3404; F04D 29/128
USPC ................ 277/359, 360, 370, 401, 408, 358
See application file for complete search history.

(56) References Cited

U.S. PATENT DOCUMENTS

| | | | | |
|---|---|---|---|---|
| 1,997,613 | A * | 4/1935 | Vroom ......................... | 277/301 |
| 3,122,374 | A * | 2/1964 | McGahan .................... | 277/400 |
| 3,700,247 | A * | 10/1972 | Butler et al. ................. | 277/318 |
| 4,103,907 | A * | 8/1978 | Inouye et al. ............... | 277/400 |
| 4,395,047 | A * | 7/1983 | Lahner, III .................. | 277/430 |
| 4,407,512 | A * | 10/1983 | Trytek ......................... | 277/400 |
| 4,545,588 | A * | 10/1985 | Nagai et al. ................. | 277/348 |
| 4,889,348 | A * | 12/1989 | Amundson et al. ......... | 277/306 |
| 5,058,905 | A * | 10/1991 | Nosowicz et al. ........... | 277/365 |
| 5,375,853 | A * | 12/1994 | Wasser et al. ............... | 277/366 |
| 5,529,315 | A * | 6/1996 | Borrino et al. .............. | 277/352 |
| 5,556,111 | A * | 9/1996 | Sedy ............................. | 277/400 |
| 5,639,097 | A * | 6/1997 | Gardner et al. .............. | 277/411 |
| 5,716,141 | A * | 2/1998 | Chen ............................ | 384/114 |
| 6,189,896 | B1 * | 2/2001 | Dickey et al. ............... | 277/608 |
| 6,428,011 | B1 * | 8/2002 | Oskouei ....................... | 277/358 |

(Continued)

*Primary Examiner* — Eugene G Byrd
(74) *Attorney, Agent, or Firm* — Edwin D. Schindler

(57) ABSTRACT

A flow inducing ring for a mechanical seal includes a body portion having a first edge face and a second edge face, and at least one first groove extending both axially and circumferentially in one direction across the body portion from the first edge face to the second edge face. At least one second groove extends both axially and circumferentially in an opposite direction across the body portion from the first edge face to the second edge face. Each of the first groove and the second groove includes an entry portion, configured to draw a barrier fluid into the groove from the first edge face, and an exit portion, that is configured to expel barrier fluid from the groove to the second edge face and to impede the drawing of barrier fluid into the groove from the second edge face. The first and second grooves preferably have substantially constant cross-sections throughout the entirety of their lengths for enhanced uniform fluid flow.

17 Claims, 8 Drawing Sheets

(56) References Cited

U.S. PATENT DOCUMENTS

| | | | |
|---|---|---|---|
| 6,575,470 B1 * | 6/2003 | Gacek et al. | 277/399 |
| 8,033,549 B2 * | 10/2011 | Huang | 277/366 |
| 2009/0140494 A1 * | 6/2009 | Roddis | 277/408 |

* cited by examiner

FLOW INDUCING RING FOR A MECHANICAL SEAL

CROSS-REFERENCE TO RELATED APPLICATIONS

This is a continuation-in-part of U.S. patent application Ser. No. 11/910,261, filed Sep. 29, 2007, now abandoned as representing the U.S. National Phase, pursuant to 35 U.S.C. § 371, of P.C.T. Application No. PCT/GB2006/001210, filed Mar. 31, 2006.

BACKGROUND OF THE INVENTION

Technical Field of the Invention

The present invention relates, generally, to a flow inducing ring for directing barrier fluid along a desired flow path within a mechanical seal.

More particularly, the present invention relates to a mechanical seal comprising a flow inducing ring with grooves that are preferably of constant, or equal, cross-section throughout their lengths for providing a more uniform fluid flow.

Description of the Prior Art

Mechanical seals are typically used to separate a first fluid from a second fluid. In the context of a pump, for example, a mechanical seal is mounted so as to extend between the pump shaft and the pump housing.

A mechanical seal for separating a first fluid from a second fluid includes a rotary assembly for mounting on a rotatable shaft for rotation therewith and a stationary assembly for securing to a fixed structure within which the rotary assembly is located. Such a seal includes a "floating component" which forms part of either the rotary or the stationary assembly and which is axially moveable relative to the rotatable shaft. In addition, the seal includes a "static" component which forms part of the other of the rotary and stationary assemblies, this component being axially fixed relative to the rotatable shaft. The floating component has a flat angular end face or seal face which is directed toward the static component, usually by means of one or more springs, to close the seal faces together to form a sliding face seal.

A seal with a floating component forming part of the rotary assembly is described as a rotary seal and a seal whose floating component forms part of the stationary assembly is referred to as a stationary seal.

If the sliding seal between the rotary and stationary components is assembled and pre-set prior to despatch from the manufacturer, the seal is referred to as a "cartridge seal". If the rotary and stationary components are despatched in unassembled form from the manufacturer, the seal is a "component seal".

A mechanical seal may be single mechanical seal or a multiple mechanical seal, typically a double or triple mechanical seal. Furthermore a mechanical seal may include a barrier fluid system by means of which a third fluid, normally a liquid, is fed to the seal and this third or barrier fluid acts to separate the first and second fluids and is intended to facilitate the removal of heat generated between the sliding seal faces, thereby helping to prolong the life of the seal.

In order for the barrier fluid system to be effective, the barrier fluid has to be fed to the seal and, within the seal, to one or more areas where cooling is to be effected and thence is fed away from the seal. This involves axial movement of the barrier fluid and to some extent this is adversely affected by the forces induced as a result of the rotation of the rotary assembly relative to the stationary assembly.

Previously, a flow inducing ring has been used to direct barrier fluid within a mechanical seal. Furthermore, the deleterious effects of rotation on the axial movement of the barrier fluid have been overcome by using a flow inducing ring 113 as described in United Kingdom Patent Application No. 2,347,180 and depicted in FIGS. 3 and 4 thereof. The flow inducing ring 113 is located within the mechanical seal and is mounted to rotate with the shaft. FIG. 3 indicates the flow inducing ring comprises at least one groove 115 extending both axially and circumferentially in one direction across the ring and at least one other groove 116 extending both axially and circumferentially in the opposite direction across the ring. Grooves extending in the same direction are configured to form "single grooves" 1137, whereas grooves extending in opposite directions and converging on the inboard or outboard edge of the body portion 1131 form "double grooves" 1138. An example of a resulting pattern of grooves is shown in FIG. 4 and comprises alternating double and single grooves. The grooves are arranged such that barrier fluid is caused to flow in the same direction regardless of the direction of the rotation of the shaft. In the flow inducing ring depicted in FIGS. 3 and 4, the grooves are arranged to always propel barrier fluid from the inboard side towards the outboard side of the flow inducing ring, i.e. in the outboard direction. When the shaft and thereby flow inducing ring is rotated in a first direction, grooves 115 are effective to cause the barrier fluid to flow from the inboard side of the ring to the outboard side of the ring in the outboard direction. Then, when the shaft (and flow inducing ring) rotates in the second and opposite direction, grooves 116 are effective to cause barrier fluid flow in the same outboard direction (from the inboard side to the outboard side of the ring). Accordingly, the barrier fluid is directed to flow in a particular direction irrespective of the direction of rotation of the flow inducing ring and shaft.

Unfortunately, there is a significant problem with this particular design. It has been found that barrier fluid is not only directed in the desired barrier fluid flow direction when the flow inducing ring is rotated. More specifically, it has been found that barrier fluid is also drawn into and directed along the grooves in the opposite direction to the desired flow path whilst the flow inducing ring is rotating. For example, whilst the fluid inducing ring rotates in the first direction and grooves 115 act to propel barrier fluid in the outboard direction, barrier fluid is also drawn into grooves 116 and directed along these grooves in an inboard direction from the outboard side towards the inboard side of the ring. Likewise, when the fluid inducing ring rotates in the second and opposite direction and grooves 116 act to propel barrier fluid in the outboard direction, barrier fluid is also drawn into grooves 115 from the outboard side of the ring and directed along these grooves in the inboard direction to the inboard side of the ring.

SUMMARY OF THE INVENTION

The present invention seeks to counteract the barrier fluid flow problems incurred by the above-mentioned prior art device. Embodiments of the present invention seek to control the flow of barrier fluid in one direction only. Embodiments of the invention seek to direct barrier fluid along a desired flow path and prevent or minimize any back-pumping effects of barrier fluid.

In a first aspect of the invention there is provided a flow inducing ring for a mechanical seal comprising a body portion having a first edge face and a second edge face; at least one first groove extending both axially and circumferentially in one direction across the body portion from the first edge face to the second edge face; and at least one second groove extending both axially and circumferentially in the opposite direction across the body portion from the first edge face to the second edge face; and characterized in that: each groove comprises an entry portion for drawing barrier fluid into the groove from the first edge face and an exit portion for expelling barrier fluid from the groove to the second edge face.

Preferably, each groove has a substantially constant, or fixed, cross-section along its entire length. Providing the grooves with a constant cross-section has the surprising advantage over "non-constant" grooves, or grooves with unequal cross-sections, in that grooves with varying cross-sections are more likely to give rise to suction and fluid discharge problems, as well as fluid and heat/turbulence, whereas a constant cross-section for the grooves throughout their lengths provides a more uniform fluid flow.

Alternatively, each groove comprises an entry portion shaped and configured to draw barrier fluid into the groove from the first edge face and an exit portion shaped and configured to expel barrier fluid from the groove to the second edge face and to impede the drawing of barrier fluid into the groove from the second edge face.

Preferably, the at least one first groove extends circumferentially in a clockwise direction across body portion from the first edge face to the second edge face and the at least one second groove extends circumferentially in an anticlockwise direction across the body portion from the first edge face to the second edge face.

The first edge face may be an inboard side of the body portion and the second edge face is an outboard side of the body portion. Alternatively, the first edge face may be an outboard side of the body portion and the second edge face is an in board side of the body portion.

Preferably, the entry portion has a plan view angle of between 1° and 89° and the exit portion has a plan view angle of approximately 90°.

Preferably, each groove has a curved profile with one or more radii.

The base of each groove may be inclined relative to the longitudinal axis of the ring.

The body portion between at least two grooves may be is inclined relative to the longitudinal axis of the ring.

The at least one first groove is preferably axially adjacent or separated from the at least one second groove.

A second aspect of the invention relates to a mechanical seal comprising:
(a) a rotary assembly for mounting on rotatable shaft rotation therewith;
(b) a stationary assembly for securing to a fixed structure within which the rotary assembly;
(c) said rotary assembly and said stationary assembly each carrying a respective mating sealing face;
(d) one of said seal faces being located on a floating component mounted for axial movement with respect to said shaft;
(e) means for urging the floating component in a direction toward the other of said seal faces;
(f) means for feeding a third fluid to a location within the seal which, when the seal is in use, lies between the first and second fluids; and characterized in further comprising:
(g) means for promoting axial flow of said third fluid within the seal, said axial flow promoting means comprising:
a body portion having a first edge face and a second edge face;
at least one first groove extending both axially and circumferentially in one direction across the body portion from the first edge face to the second edge face;
at least one second groove extending both axially and circumferentially in the opposite direction across the body portion from the first edge face to the second edge face; and,
each groove comprising an entry portion for drawing barrier fluid into the groove from the first edge face and an exit portion for expelling barrier fluid from the groove to the second edge face with each groove having a substantially constant cross-section for the entirety of its length.

In an alternative second aspect of the invention there may be provided a mechanical seal comprising:
(a) a rotary assembly for mounting on rotatable shaft rotation therewith;
(b) a stationary assembly for securing to a fixed structure within which the rotary assembly;
(c) said rotary assembly and said stationary assembly each carrying a respective mating sealing face;
(d) one of said seal faces being located on a floating component mounted for axial movement with respect to said shaft;
(e) means for urging the floating component in a direction toward the other of said seal faces;
(f) means for feeding a third fluid to a location within the seal which, when the seal is in use, lies between the first and second fluids; and,
characterized in further comprising:
(g) means for promoting axial flow of said third fluid within the seal, said axial flow promoting means comprising:
a body portion having a first edge face and a second edge face;
at least one first groove extending both axially and circumferentially in one direction across the body portion from the first edge face to the second edge face;
at least one second groove extending both axially and circumferentially in the opposite direction across the body portion from the first edge face to the second edge face; and whereby each groove comprises an entry portion shaped and configured to draw barrier fluid into the groove from the first edge face and an exit portion shaped and configured to expel barrier fluid from the groove to the second edge face and to impede the drawing of barrier fluid into the groove from the second edge face with each groove having a substantially constant cross-section for the entirety of its length.

Preferably, the means for promoting axial flow of said third liquid within the seal comprises any of the features relating to the first aspect of the invention.

Preferably, the body portion forms part of the rotary assembly. The fixed structure may comprise a housing having a component located radially outside the body portion, the component having an inner face which is inclined relative to the longitudinal axis of the seal. Alternatively, the fixed structure may comprise a housing having a component located radially outside the body portion, whereby an eccentric annular space is defined between the component and body portion.

The body portion may instead form part of the stationary assembly.

The present invention may be applied to rotary and stationary seals whether they are of cartridge or component type.

The present invention may be applied to a single or multiple mechanical seal. Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
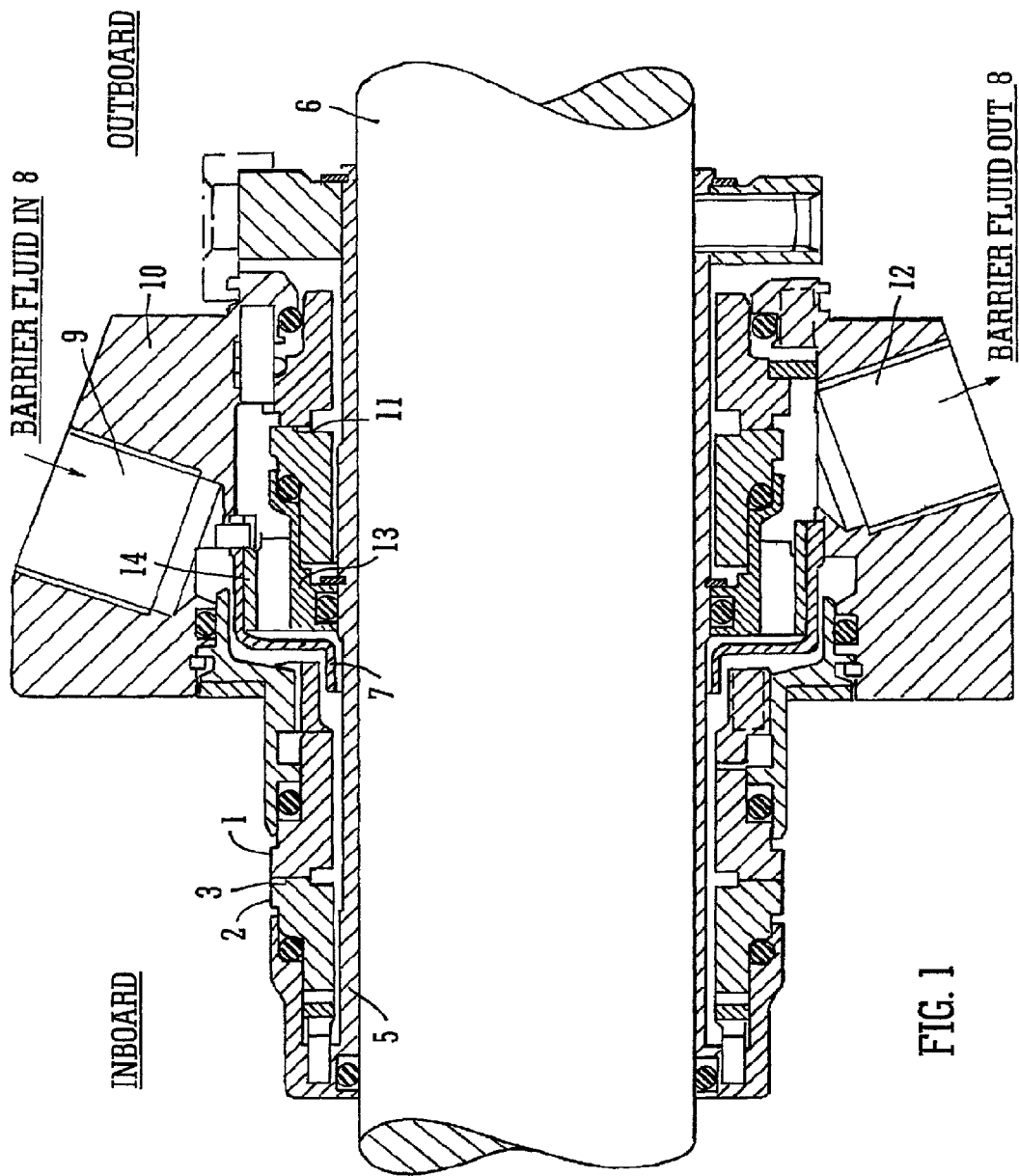
FIG. 1 is a longitudinal section through a double stationary mechanical seal in accordance with the present invention.
Figure 2:
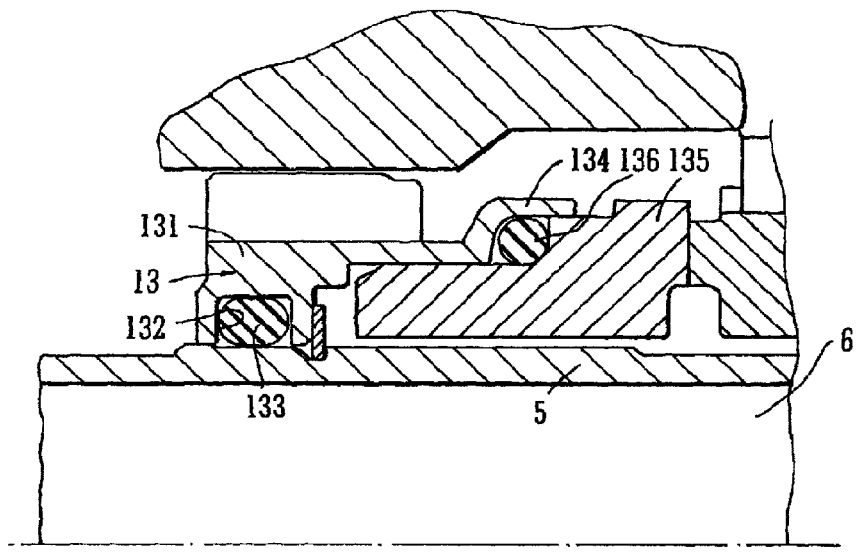
FIG. 2 is a longitudinal section of part of a mechanical seal comprising a first embodiment of a flow inducing ring according to the present invention.
Figure 3:
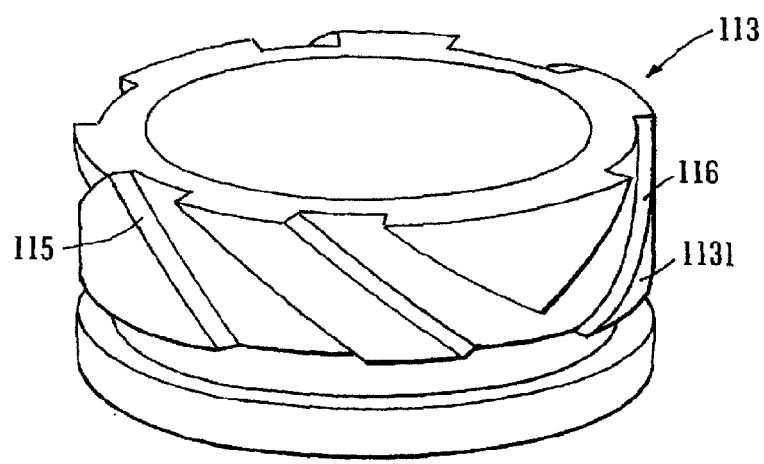
FIG. 3 is a perspective view of a prior art flow inducing ring.
Figure 4:
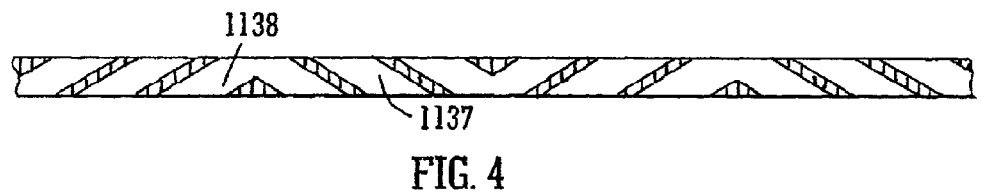
FIG. 4 is an extrapolated plan view of the grooved face of the flow inducing ring shown in FIG. 3.

The present invention will now be described, by way of examples only, with reference to the accompanying drawings:

Referring to FIG. 1 of the accompanying drawings, there is illustrated a double stationary mechanical seal located about a rotatable shaft 6. The seal is a cartridge seal and includes on the inboard side of the seal a stationary component 1 and, a rotary component 2 which together define sealing faces 3. Rotary component 2 is located radially outwardly of a sleeve 5, which is fixed for rotation with shaft 6.

As well as the inboard sealing components mentioned above, the seal includes an outboard sealing arrangement providing sealing faces 11. Barrier fluid is fed to the seal via inlet 9 located in gland 10. The barrier fluid follows a path located radially outwardly of a deflector ring 7 in a direction towards seal face 3, this path being indicated by the arrows in the upper part of FIG. 1. The barrier fluid then follows a path located radially inwardly of deflector 7, as indicated by the arrows in the lower part of FIG. 1. The barrier fluid exits from the seal via outlet 12 located in gland 10. The barrier fluid may then be recycled back to inlet 9.

A flow inducing ring 13 is located between the inboard sealing faces 3 and the outboard sealing faces 11. As best seen in FIGS. 2, 5, 6 and 7, ring 13 includes a main body portion 131 from the inner edge of which extends an integral channel 132 housing an O-ring 133. O-ring 133 bears against sleeve 5.

Extending in an outboard direction from main body portion 131 of ring 13 is a flange 134, which steps outwardly to provide a space between this flange and the rotary component 135 of the outboard seal. Located in this space is a further O-ring 136. Accordingly, the flow inducing ring 13 forms part of the rotary assembly with which it is in sealing engagement through O-rings 133 and 136.

Extending into main body portion 131 of ring 13 is a plurality of deep grooves, slots or vanes 15, 16 each of which extend from the inboard face of main body portion 131 to the outboard face thereof. Each groove 15, 16 is rectangular in cross-section and extends not only axially, but also circumferentially across the main body portion 131 of ring 13. Some of the grooves 15 extend circumferentially in one direction and others (grooves 16) in the opposite direction. From the patterns of grooves depicted in FIGS. 8a and 9a it can be seen that some grooves 137 are single grooves and others 138 are double grooves due to the meeting of two single grooves where they converge on the inboard or outboard edge of body portion 131. The resulting patterns comprise alternating double and single grooves, the double grooves being of chevron shape in plan.

Figure 5:
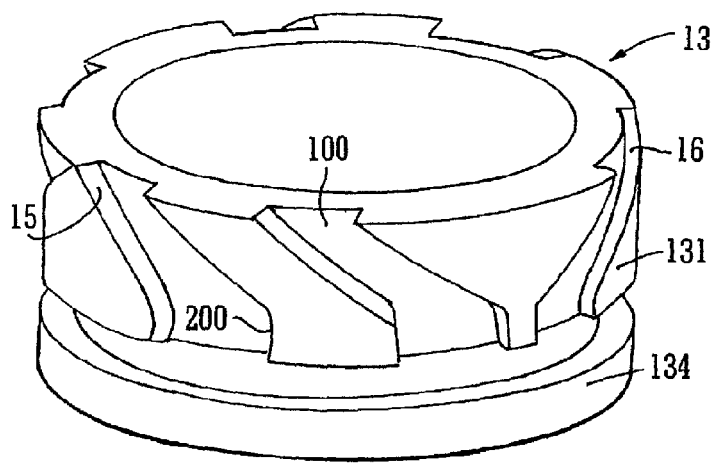
FIG. 5 is a perspective view of a flow inducing ring according to the present invention.
Figure 6:
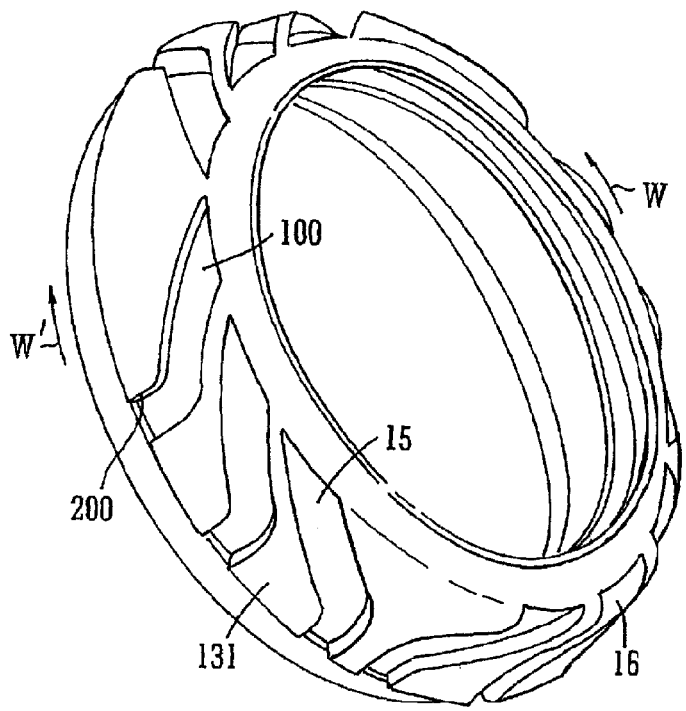
FIG. 6 is a second perspective view of the flow inducing ring shown in FIG. 5.
Figure 7:
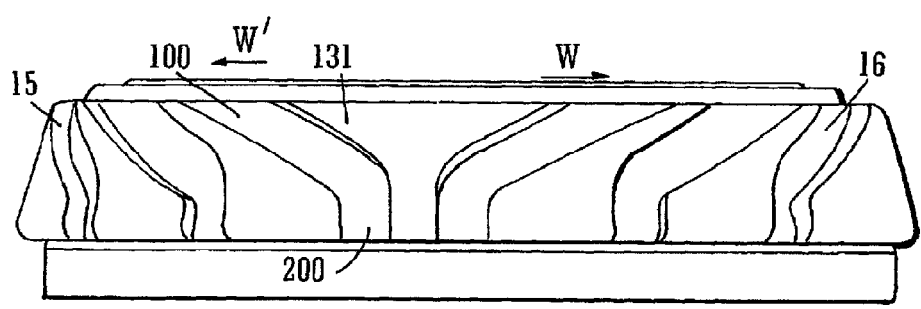
FIG. 7 is a side view of the flow inducing ring shown in FIGS. 5 and 6.

In the example depicted in FIGS. 5, 6 and 7, grooves 15 extend circumferentially in an anticlockwise (counterclockwise) direction across the main body portion 131 from the inboard side of the ring 13 to the outboard side of the ring, i.e., the grooves 15 extend left to right across the body portion from the inboard side to the outboard side of the ring. Meanwhile, grooves 16 extend circumferentially in a clockwise direction across the main body from the inboard side to the outboard side of the ring 13, i.e., the grooves 16 extend right to left across the body portion from the inboard side to the outboard side of the ring 13. It can be seen from the figures that groove 16 is essentially a mirror image of groove 15. The grooves 15 and 16 are located on ring 13 such that, when the ring 13 rotates with the seal barrier, fluid is propelled axially in an outboard direction from the inboard side of the ring 13 to the outboard side of the ring 13. When the shaft 6 rotates in the direction indicated by arrow W', then grooves 15 are effective to cause the barrier fluid to flow in the outboard direction and when the shaft rotates in the opposite direction (in the direction indicated by arrow W), grooves 16 are effective to cause barrier fluid flow in the same outboard direction. By arranging the grooves 15, 16 circumferentially in opposite directions across the ring 13, barrier fluid is able to flow in the same direction irrespective of the direction of the rotation of flow inducing ring with the shaft.

FIGS. 8a to 9b illustrate different groove patterns that are effective to produce barrier fluid flow in the desired direction irrespective of the direction of rotation of the shaft. It can be seen that in each of these groove patterns there are some grooves 15 which extend circumferentially in one direction from the inboard side to the outboard side of the ring 13 and others (grooves 16) extend circumferentially in the opposite direction from the inboard side to the outboard side of the ring 13. The grooves extend circumferentially in either a clockwise or anticlockwise across the ring 13. The pattern of grooves, as well as the shape of each groove, may be varied to suit the performance required from the flow inducing ring.

Figure 8A:
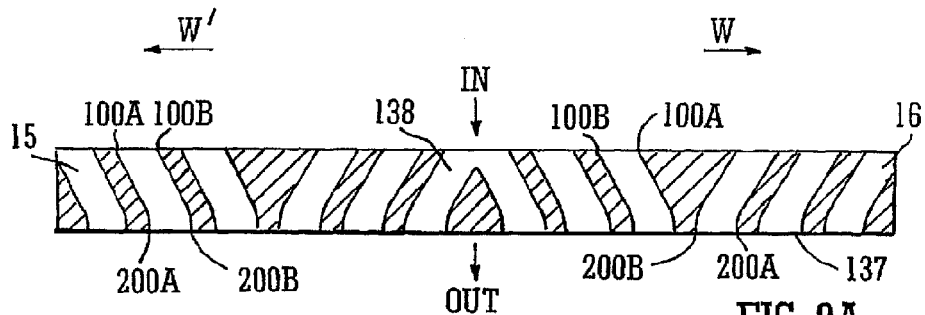
FIGS. 8a and 8b is an extrapolated plan view of a first groove pattern of a flow inducing ring according to the present invention with the grooves having a constant cross-section along the entirety of their lengths.
Figure 8B:
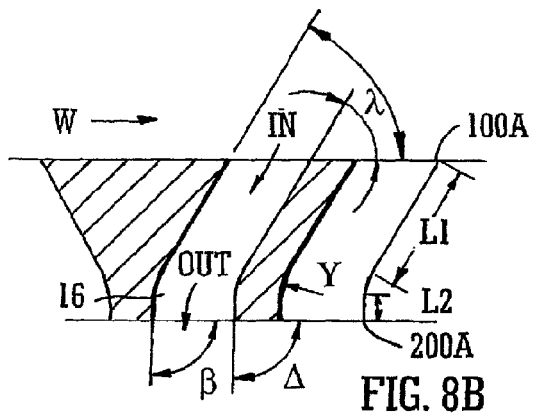

As best illustrated in FIGS. 8a and 8b, each groove preferably has a substantially constant, or fixed, cross-section along its entire length. Providing the grooves with a constant cross-section has the surprising advantage over "non-constant" grooves, or grooves with unequal cross-sections, in that grooves with varying cross-sections are more likely to give rise to suction and fluid discharge problems, as well as fluid and heat/turbulence, whereas a constant cross-section for the grooves throughout their lengths provides a more uniform fluid flow.

FIGS. 8a to 9b also illustrate different groove patterns that are effective to produce barrier fluid flow in only one direction (the desired direction), irrespective of the direction of rotation of the shaft. It will be seen that each groove 15, 16 comprises an entry portion 100 and exit portion 200. The entry portion 100 is shaped for drawing the barrier fluid into the groove. The exit portion 200 is shaped for directing fluid from the groove into the mechanical seal. The exit portion 200 is also shaped to impede, minimize or prevent the drawing of barrier fluid into the groove. Hence, barrier fluid may only flow in one direction along the grooves from the entry portion to the exit portion. Any back-pumping of barrier fluid into groove from the exit portion is prevented or minimized.

The entry portion 100 of each groove 15, 16 is shaped such that it is angled with respect to the longitudinal axis (axis of rotation) of the flow inducing ring 13. The entry portion 100 of each groove has a leading edge 100A and a trailing edge 100B in accordance with the direction of rotation. The angle of the leading edge, λ, with respect to the longitudinal axis may vary from 1° to 89°, typically from 5° to 85°. Likewise, the angle of the trailing edge, α, with respect to the longitudinal axis may vary from 1° to 89°, typically from 5o to 85°. The angle of the leading edge, λ, may be smaller or identical to the angle of the trailing edge, α. The angles of the leading edge and trailing edges are chosen such that the entry portion 100 is shaped to "cut" into the barrier fluid as the flow inducing ring rotates and draw barrier fluid into the groove.

The exit portion 200 of each groove 15, 16 is also shaped such that it is angled with respect to the longitudinal axis (axis of rotation) of the flow inducing ring 13. The exit portion has a leading edge 200A and trailing edge 200B, in accordance with the direction of rotation. The angle of the leading edge, ⊿, and the angle of the trailing edge, β, are preferably identical and preferably substantially 90°. The exit portion 200 is shaped to expel barrier fluid from the groove. More specifically, the exit portion 200 is shaped such that barrier fluid is directed from the groove in a direction that is substantially parallel to the axis of rotation. The exit portion 200 is not shaped to "cut" into the barrier fluid like the entry portion 100. Thus, barrier fluid is not drawn into the exit portion 200. Accordingly, barrier fluid may only flow in one direction along the groove; from the entry portion 100 to the exit portion 200. Hence, the back-pumping effect associated with the prior art device is avoided.

Since the entry portion 100 and exit portion of each groove are arranged at different angles with respect to the axis of rotation, the entry portion 100 and exit portion 200 are shaped and configured such that the groove has a curved profile. The curved profile may have one or more radii.

FIGS. 8a and 8b illustrate a groove pattern where barrier fluid is drawn from the inboard side towards the outboard side of the flow inducing ring 13. Grooves 15 extend axially and circumferentially in an anticlockwise direction (left to right) from the inboard side to the outboard side of the ring 13. Grooves 16 extend axially and circumferentially in a clockwise direction (right to left) from the inboard side to the outboard side of the ring. The entry portion 100 of each groove 15, 16 is shaped and configured such that the angle of the leading edge, λ, and angle of the trailing edge, α, are identical and approximately 30°. The exit portion 200 of each groove 15, 16 is shaped and configured such that the angle of its leading edge, ⊿, and the angle of its trailing edge, B, is substantially 90°. FIG. 8b shows that when the flow inducing ring 13 rotates in direction indicated by arrow, ω, the entry portion 100 of grooves 16 cuts through the barrier fluid and draws fluid into the grooves 16. Barrier fluid is then directed to flow along length L1 of the entry portion, along a curved portion with radius r and along length L2 of the exit portion 200 of groove 16. The barrier fluid is then directed by the exit portion 200 into the mechanical seal in a direction that is substantially parallel to the axis of rotation. The exit portions of both grooves 15 and 16 are configured such that they are unable to "cut through" barrier fluid so the flow of any barrier fluid into the exit portions in either groove 15 or 16 from the outboard side of the ring 13 is prevented or restricted. Hence, when the flow inducing ring rotates in direction of ω, the barrier fluid may only flow along grooves 16. In this case, barrier fluid is drawn into grooves 16 from the inboard side of the flow inducing ring 13 via the entry portion and it is expelled from the outboard side of the ring 13 via the exit portion. It follows that when the flow inducing ring rotates in the direction indicated by arrow ω, barrier fluid may only flow along grooves 15 from the inboard side to the outboard side of the ring 13. As the ring 13 rotates in the direction of ω, barrier fluid is drawn into grooves 15 from the inboard side of the ring 13 via the entry portions 100 of grooves 15, it is impeded or prevented from entering the exit portions 200 of both grooves 15 and 16 and it is expelled from the outboard side of the ring 13 via the exit portions 200 of grooves 15 in a direction that is substantially parallel to the axis of rotation.

FIGS. 8a and 8b illustrates a groove pattern of a flow inducing ring according with the grooves 15 and 16 having a constant cross-section along the entirety of their lengths, which provides a more uniform fluid flow and avoids problems often associated with grooves having irregular cross-sections. Such problems frequently encountered with pertain to suction and discharge irregularities and fluid and heat turbulence.

Figure 9A:
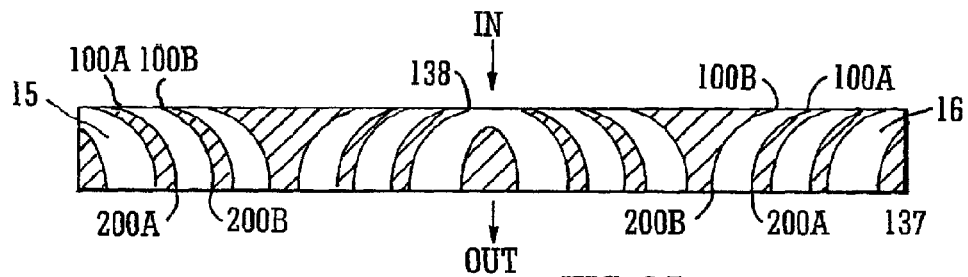
FIGS. 9a and 9b is an extrapolated plan view of second groove pattern of a flow inducing ring according to the present invention.
Figure 9B:
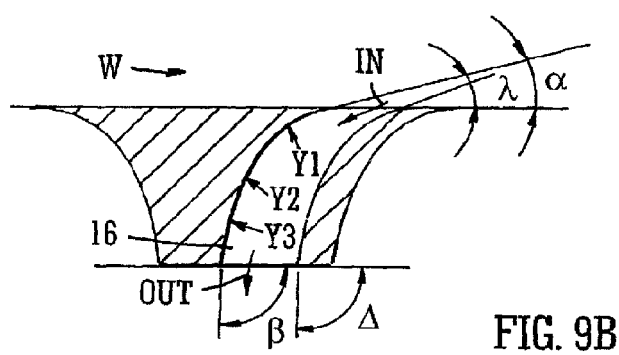

FIGS. 9a and 9b depict an alternative groove pattern where the angle of the leading edge X is smaller than the angle of the trailing edge, α, of the entry portions 100 of the grooves 15, 16. Furthermore, the grooves are provided with a curved path having radii r1, r2 and r3. This curved path is configured so as to restrict the generation of eddy currents within the barrier fluid as it is drawn into and flows along the grooves 15, 16. In order to restrict the flow of barrier fluid in only the outboard direction, the exit portions 200 of the grooves 15, 16 are shaped such that the angle of its leading edge, ⊿, and the angle of its trailing edge, B, is substantially 90°. As with the groove pattern depicted in FIGS. 8a and 8b, the grooves 15 and 16 in the groove pattern of FIGS. 9a and 9b are arranged such that barrier fluid is drawn into the entry portions 100 of grooves 16 and expelled from the exit portions 200 of grooves 16 when the flow inducing ring rotates in the direction of ω, and then barrier fluid is drawn into the entry portions 100 of groove 15 and expelled from the exit portions 200 of grooves 15 when the flow inducing ring rotates in the ώ direction. The exit portions 200 are shaped to prevent or minimize any barrier fluid from being drawn into either grooves 15 or 16 from the outboard side of the ring 13. Hence, barrier fluid may only flow from the inboard side towards the outboard side of ring 13 when the ring rotates.

Figure 10:
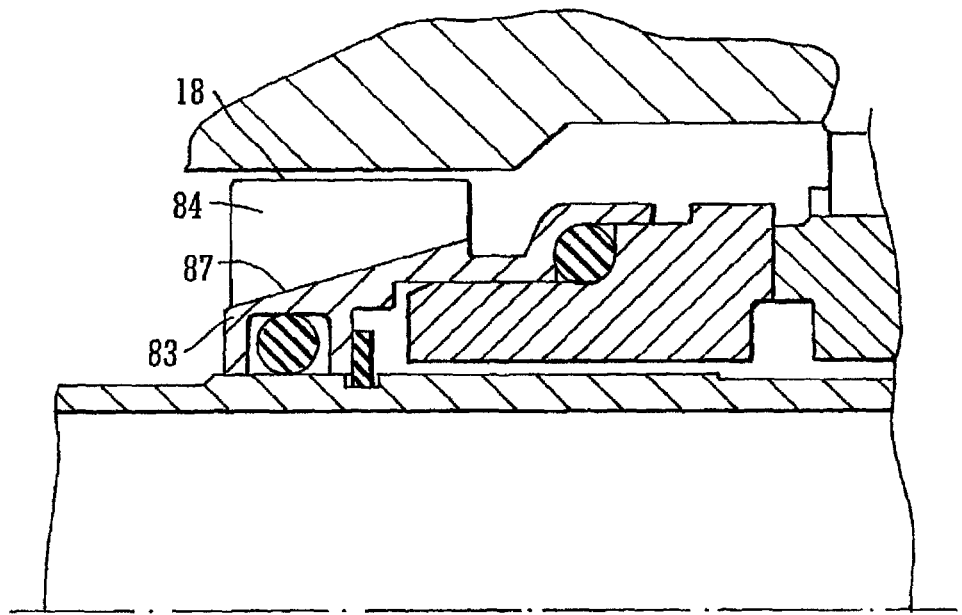
FIG. 10 is a longitudinal cross-section through mechanical seal comprising a second embodiment of the flow inducing ring according to the present invention.

FIG. 10 depicts a second embodiment of the present invention where the outer radial surface 18 of the flow inducing ring 83 is provided with grooves 84, each of which has an inclined base 87, the inclination being in an outward direction from the inboard to the outboard side of the seal.

Figure 11:
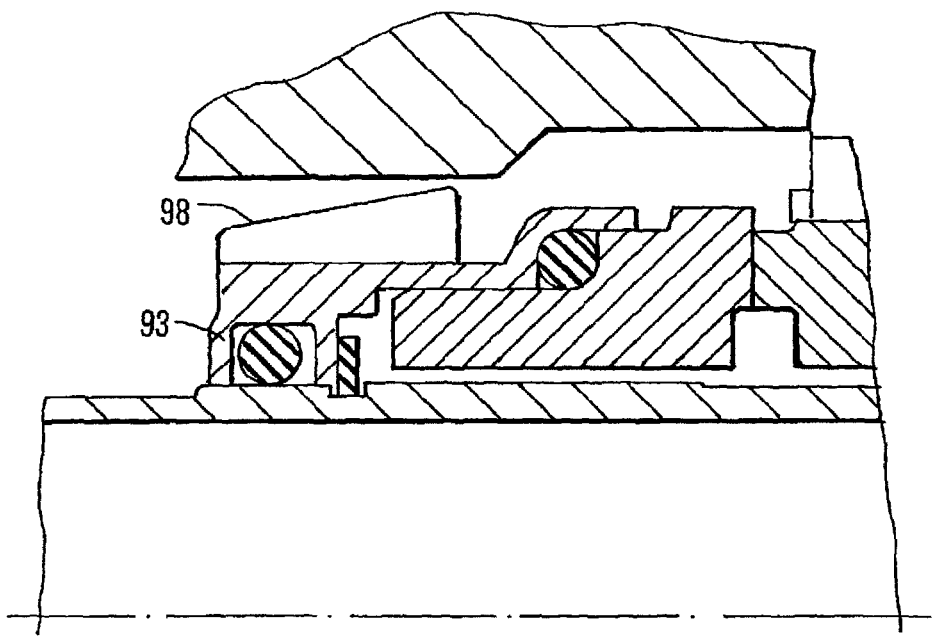
FIG. 11 is a longitudinal cross-section through a mechanical seal comprising a third embodiment of a flow inducing ring according to the present invention.

FIG. 11 depicts a third embodiment of the present invention where the flow inducing ring 93 has an inclined outside diameter 98, the inclination again being outwardly from the inboard to the outboard side of the seal.

Figure 12A:
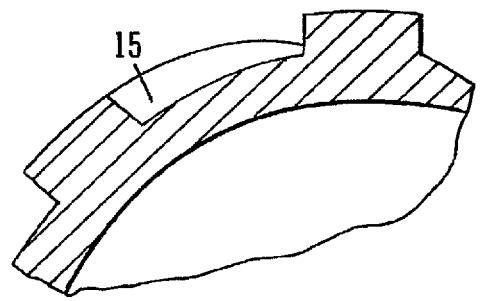
FIGS. 12a to 12c illustrate different groove profiles of flow inducing rings according to the present invention.
Figure 12B:
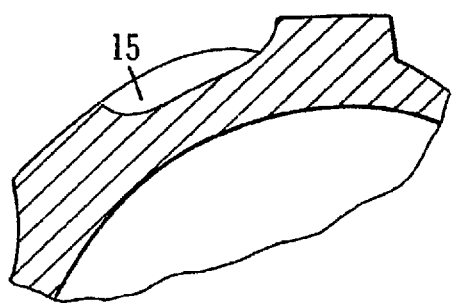
Figure 12C:
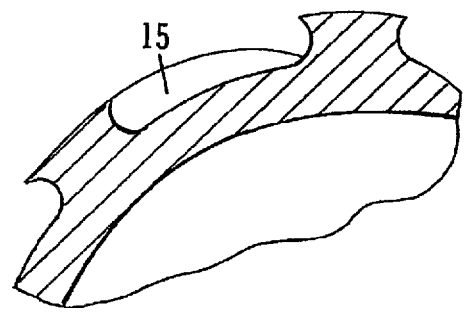

Referring to FIGS. 12 to 12c of the accompanying drawings, there are illustrated different groove cross-sections which may be used in the flow inducing ring 13 of the present invention. In FIG. 12a, the groove 15 has a cross-section similar to that shown in FIGS. 5, 6 and 7. The groove in cross-section has a base which is curved to follow the circumferential surface of the ring at that diameter. The sides of the groove extend radially outwardly from the base.

The groove 15 shown in FIG. 12b is gently curved from the centre of its base where it follows the circumference at that diameter, the curve changing direction to provide the curved sides of the groove extending to the outer surface of the ring. In FIG. 12c the grooves 15 are also curved but much more sharply at the sides of the groove so that each side is channel-shaped.

Figure 13:
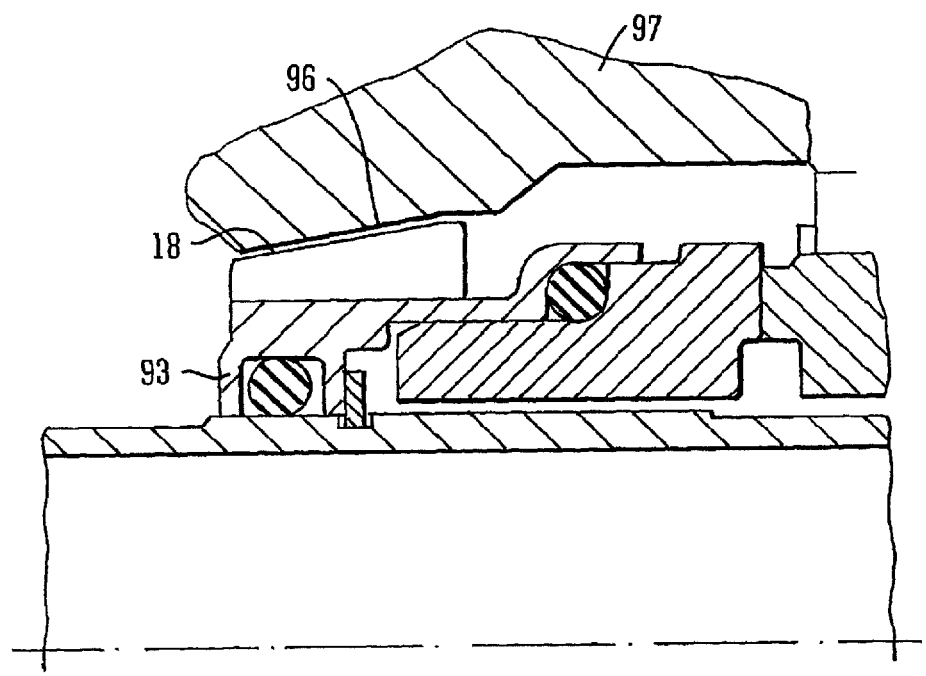
FIG. 13 is a longitudinal cross-section through a mechanical seal comprising a fourth embodiment of a flow inducing ring in accordance with the present invention.

FIG. 13 depicts a fourth embodiment of the present invention where the inner radial surface 96 of housing 97 is inclined in a direction outwardly from the inboard to the outboard side of the seal. Furthermore, the outer radial surface 18 of flow inducing ring 93 is also inclined in the same direction to provide a gap between housing 97 and ring 93 which is constant from the inboard to the outboard side.

Where the inner radial surface of the housing and/or the outer radial surface of the flow inducing ring is inclined, the angle of inclination may vary from 1° to 89°.

Figure 14:
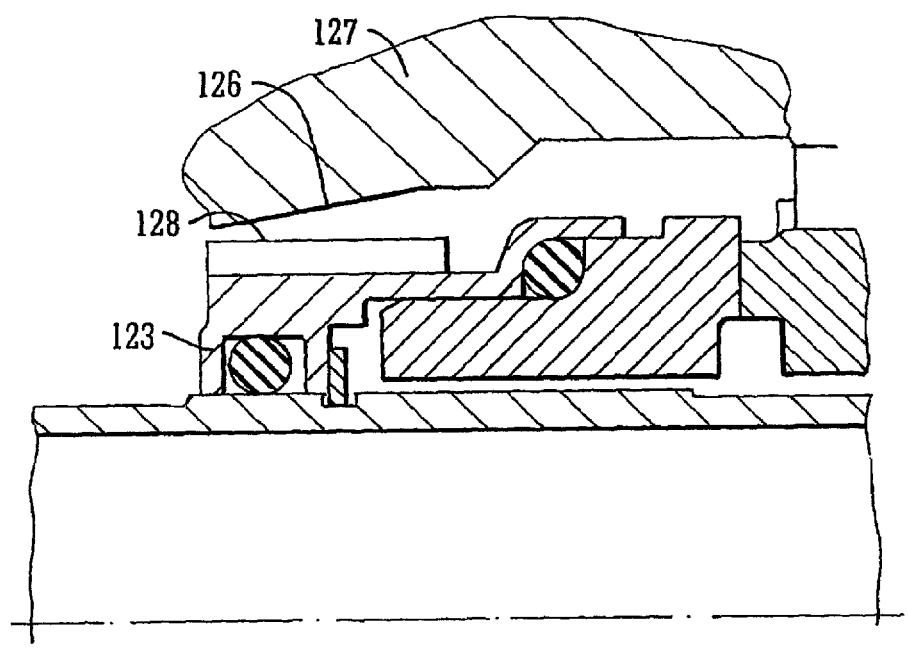
FIG. 14 is a longitudinal cross-section through a mechanical seal comprising a fifth embodiment of a flow inducing ring in accordance with the present invention; and, FIG. 15 is a longitudinal cross-section through a mechanical seal comprising a sixth embodiment of a flow inducing ring in accordance with the present invention.

FIG. 14 depicts a fifth embodiment of the present invention where the inner radial surface 126 of housing 127 is inclined in a direction outwardly from the inboard to the outboard side of the seal. The outer radial surface 128 of flow inducing ring 123 is parallel to the longitudinal axis of the seal so that the gap between the two adjacent radial surfaces increases from the inboard to the outboard side of the seal.

Figure 15:
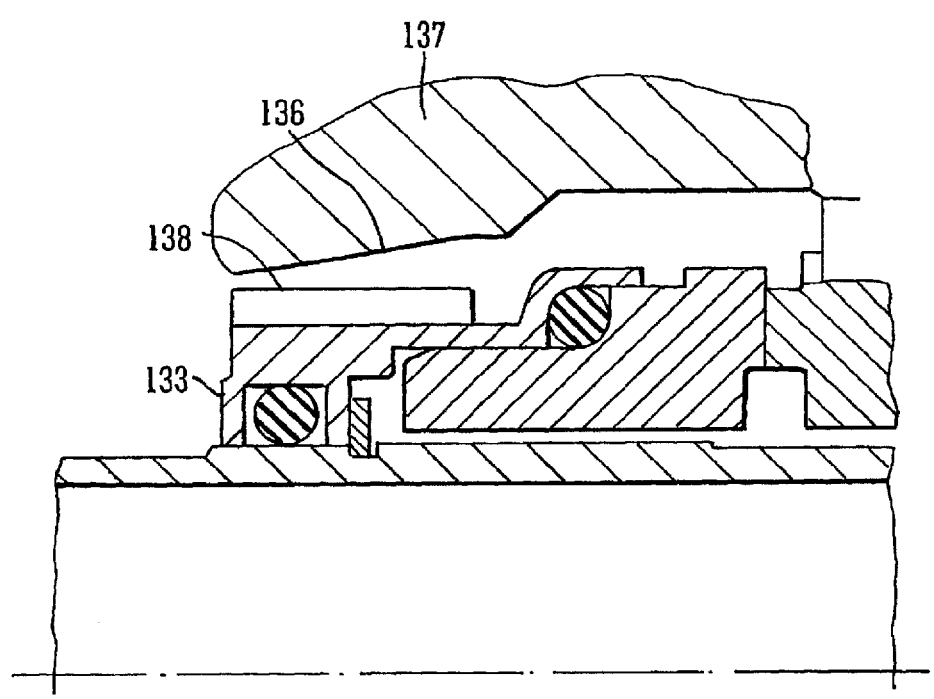

FIG. 15 depicts a sixth embodiment of the present invention where the housing 137 is eccentrically mounted or the inner radial surface 136 of the housing is eccentrically shaped such that the annular space defined between the stationary and rotary components varies between a region of minimum radial dimension and a region of maximum radial dimension offset circumferentially to each other. Hence, an eccentric annular space or clearance is provided between the housing 137 and flow inducing ring 133. Accordingly, the pumping effect of barrier fluid within the mechanical seal and across the flow inducing ring 133 is improved.

It should be appreciated that the present invention may be applied to a seal to be provided between a stationary shaft and a rotatable housing.

It should also be appreciated that the flow inducing means may be located anywhere in the flowpath of the barrier fluid. For instance, in another embodiment in accordance with the present invention, the flow inducing means may be integral with the sleeve (item 5 of the FIG. 1 embodiment) and may be positioned below a deflector (item 7A of FIG. 1) which in turn extends below the inboard sealing faces.

While only several embodiments of the present invention have been shown and described, it will be obvious to those skilled in the art that many modifications may be made to the present invention without departing from the spirit and scope thereof.

What is claimed is:

1. A pumping apparatus for promoting a flow of a barrier fluid through a mechanical seal, comprising:
   means for pumping a flow of a barrier fluid through a mechanical seal for a piece of equipment having a rotating shaft; and,
   a flow inducing ring that substantially prevents a back-flow direction of the flow of the barrier fluid through the mechanical seal, comprising:
   a body portion;
   a first groove extending both axially and circumferentially in a first direction across said body portion, said first groove having an entry portion for drawing barrier fluid into said first groove and an exit portion for expelling barrier fluid from said first groove with the exit portion being shaped so that the barrier fluid is directed from the exit portion of said first groove into the mechanical seal in a direction that is substantially parallel to a longitudinal axis, or axis of rotation, of said flow inducing ring and the exit portion being further shaped so that the exit portion does not interfere with, or cut into, the flow of the barrier fluid with said first groove having a constant cross-section along its length between the entry portion and the exit portion and with the entry portion of said first groove being angled relative to the longitudinal axis of said flow inducing ring and the exit portion being angled relative to the longitudinal axis of said flow inducing ring and having a leading edge and a trailing edge with an angle of the leading edge and an angle of the trailing edge being substantially identical to one another, wherein the first groove having a pair of inner walls extending from the entry portion to the exit portion, wherein the inner walls comprise a profile having a first straight portion having a first length extending to a curved portion having a radius and a second straight portion having a second length extending from said curved portion to the exit portion, and the angle of the leading edge and the angle of the trailing edge each being substantially 9Oo for substantially preventing back-pumping and therefore a back-flow direction of the barrier fluid, the entry portion and the exit portion of said first groove being arranged at different angles relative to the axis of rotation of said flow inducing ring; and, a second groove extending both axially and circumferentially in a second direction across said body portion, said second direction being a direction opposite said first direction, said second groove having an entry portion for drawing barrier fluid into said second groove and an exit portion for expelling barrier fluid from said second groove with the exit portion being shaped so that the barrier fluid is directed from the exit portion of said second groove into the mechanical seal in a direction that is substantially parallel to a longitudinal axis, or axis of rotation, of said flow inducing ring and the exit portion being further shaped so that the exit portion does not interfere with, or cut into, the flow of the barrier fluid with said second groove having a constant cross-section along its length between the entry portion and the exit portion and with the entry portion and the exit portion of said second groove being angled relative to the longitudinal axis of said flow inducing ring and the exit portion having a leading edge and a trailing edge with an angle of the leading edge and an angle of the trailing edge being substantially identical to one another, the second groove having a pair of inner walls extending from the entry portion to the exit portion, wherein the inner walls comprise a profile having a first straight portion having a first length extending to a curved portion having a radius and a second straight portion having a second length extending from said curved portion to the exit portion, and the angle of the leading edge and the angle of the trailing edge each being substantially 90o for substantially preventing back-pumping and therefore a back-flow direction of the barrier fluid, the entry portion and the exit portion of said second groove being arranged at different angles relative to the axis of rotation of said flow inducing ring, the flow of the barrier fluid though the mechanical seal being in a single direction irrespective of rotational direction of the rotating shaft of the piece of equipment.

2. The pumping apparatus for promoting a flow of a barrier fluid through a mechanical seal according to claim 1, wherein said entry portion of said first groove and said entry portion of said second groove of said flow inducing ring each have a plan view angle of between 1o and 89o.

3. The pumping apparatus for promoting a flow of a barrier fluid through a mechanical seal according to claim 1, wherein said first groove and said second groove of said flow inducing ring each have a curved profile with at least one radius.

4. The pumping apparatus for promoting a flow of a barrier fluid through a mechanical seal according to claim 1, wherein said first grove has a base and said second groove of said flow inducing ring has a base and each said base is inclined relative to the longitudinal axis of said flow inducing ring.

5. The pumping apparatus for promoting a flow of a barrier fluid through a mechanical seal according to claim 1, wherein said body portion between said first groove and said second groove of said flow inducing ring is inclined relative to the longitudinal axis of said flow inducing ring.

6. The pumping apparatus for promoting a flow of a barrier fluid through a mechanical seal according to claim 1, wherein said first groove of said flow inducing ring is axially adjacent to, or separated from, said second groove.

7. The pumping apparatus for promoting a flow of a barrier fluid through a mechanical seal according to claim 1, wherein said exit portion of said first groove of said flow inducing ring is shaped and configured for impeding a drawing of barrier fluid into said first groove and said exit portion of said second groove is shaped and configured for impeding a drawing of barrier fluid into said second groove.

8. A mechanical seal, comprising:

a rotary assembly mountable on a rotatable shaft rotation therewith, said rotary assembly having a first mating sealing face;

a stationary assembly securable to a fixed structure within said rotary assembly, said stationary assembly having a second mating sealing face;

a floating component mounted for axial movement relative to said rotatable shaft with one of said first mating sealing face of said rotary assembly or said second mating sealing face of said stationary assembly being located on said floating component;

means for urging said floating component in a direction toward either one of said first mating sealing face of said rotary assembly or said second mating sealing face of said stationary assembly, dependent upon said mating sealing face not being located on said floating component;

means for feeding a fluid to a location within said mechanical seal lying between a first fluid and a second fluid, said fluid being fed being a third fluid with the third fluid being a barrier fluid for the mechanical seal;

means for promoting axial flow of said third fluid, while substantially preventing a back-flow directional flow of said third fluid within said mechanical seal, said means for promoting axial flow and substantially preventing the back-flow directional flow, including:

a body portion;

a first groove extending both axially and circumferentially in a first direction across said body portion, said first groove having an entry portion for drawing the barrier fluid into said first groove and an exit portion for expelling barrier fluid from said first groove with the exit portion being shaped so that the barrier fluid is directed from the exit portion of said first groove into the mechanical seal in a direction that is substantially parallel to a longitudinal axis, or axis of rotation, of said means for promoting axial flow and the exit portion being further shaped so that the exit portion does not interfere with, or cut into, the flow of the third fluid or the barrier fluid with said first groove having a constant cross-section along its length between the entry portion and the exit portion and with the entry portion of said first groove being angled relative to a longitudinal axis of said means for promoting axial flow and the exit portion being angled relative to the longitudinal axis of said means for promoting axial flow and having a leading edge and a trailing edge with an angle of the leading edge and an angle of the trailing edge being substantially identical to one another, the first groove having a pair of inner walls extending from the entry portion to the exit portion, wherein the inner walls comprise a profile having a first straight portion having a first length extending to a curved portion having a radius and a second straight portion having a second length extending from said curved portion to the exit portion and the angle of the leading edge and the angle of the trailing edge each being substantially 90 degrees for substantially preventing the back-pumping of said third fluid and therefore the backflow directional flow of said third fluid, the entry portion and the exit portion of said first groove being arranged at different angles relative to the axis of rotation of said means for promoting axial flow; and, a second groove extending both axially and circumferentially in a second direction across said body portion, said second direction being a direction opposite said first direction, said second groove having a constant cross-section along its length between the entry portion and the exit portion and with the entry portion for drawing barrier fluid into said second groove and the exit portion for expelling barrier fluid from said second groove with the exit portion being shaped so that the third fluid, or the barrier fluid, is directed from the exit portion of said second groove into the mechanical seal in a direction that is substantially parallel to a longitudinal axis, or axis of rotation, of said means for promoting axial flow of said third fluid and the exit portion being further shaped so that the exit portion does not interfere with, or cut into, the flow of the third fluid, or barrier fluid, the entry portion of said second groove being angled relative to the longitudinal axis of said means for promoting axial flow and the exit portion being relative to the longitudinal axis of said means for promoting axial flow and having a leading edge and a trailing edge with an angle of the leading edge and an angle of the trailing edge being substantially identical to one another, the second groove having a pair of inner walls extending from the entry portion to the exit portion, wherein the inner walls comprise a profile having a first straight portion having a first length extending to a curved portion having a radius and a second straight portion having a second length extending from said curved portion to the exit portion and the angle of the leading edge and the angle of the trailing edge each being substantially 90 degrees for substantially preventing the back-pumping of said third fluid and therefore the back-flow directional flow of said third fluid, the entry portion and the exit portion of said second groove being arranged at different angles relative to the axis of rotation of said means for promoting axial flow of said third fluid, the flow of said third fluid though the mechanical seal being in a single direction irrespective of rotational direction of said rotatable shaft.

9. The mechanical seal according to claim 8, wherein said entry portion of said first groove and said entry portion of said second groove of said means for promoting axial flow and substantially preventing the back-flow directional flow of said third fluid each have a plan view angle of between 1o and 89o.

10. The mechanical seal according to claim 8, wherein said first groove and said second groove of said means for promoting axial flow and substantially preventing the back-flow directional flow of said third fluid each have a curved profile with at least one radius.

11. The mechanical seal according to claim 8, wherein said first grove has a base and said second groove has a base of said means for promoting axial flow and substantially preventing the back-flow directional flow of said third fluid and each said base is inclined relative to the longitudinal axis of said means for promoting axial flow and substantially preventing the back-flow directional flow.

12. The mechanical seal according to claim 8, wherein said body portion between said first groove and said second groove of said means for promoting axial flow and substantially preventing the back-flow directional flow of said third fluid is inclined relative to the longitudinal axis of said means for promoting axial flow and substantially preventing the back-flow directional flow.

13. The mechanical seal according to claim 8, wherein said first groove is axially adjacent to, or separated from, said second groove of said means for promoting axial flow and substantially preventing the back-flow directional flow of said third fluid.

14. The mechanical seal according to claim 8, wherein said exit portion of said first groove of said means for promoting axial flow and substantially preventing the back-flow directional flow of said third fluid is shaped and configured for impeding a drawing of barrier fluid into said first groove and said exit portion of said second groove of said means for promoting axial flow and substantially preventing the back-flow directional flow of said third fluid is shaped and configured for impeding a drawing of barrier fluid into said second groove.

15. The mechanical seal according to claim 8, wherein said body portion of said means for promoting axial flow and substantially preventing the back-flow directional flow of said third fluid forms a part of said rotary assembly.

16. The mechanical seal according to claim 15, wherein said fixed structure within said rotary assembly includes a housing having a component located radially outside of said body portion of said means for promoting axial flow and substantially preventing the back-flow directional flow of said third fluid, said component having an inner face inclined relative to a longitudinal axis of said mechanical seal.

17. The mechanical seal according to claim 15, wherein said fixed structure within said rotary assembly includes a housing having a component located radially outside of said body portion of said means for promoting axial flow and substantially preventing the back-flow directional flow of said third fluid with an eccentric annular space being defined between said component and said body portion.

* * * * *